United States Patent
Don et al.

(10) Patent No.: US 9,832,261 B2
(45) Date of Patent: Nov. 28, 2017

(54) CLOUD CONSISTENCY TECHNOLOGY

(71) Applicant: EMC Corporation, Hopkinton, MA (US)

(72) Inventors: Arieh Don, Newton, MA (US); Assaf Natanzon, Tel Aviv (IL)

(*) Notice: Subject to any disclaimer, the term of this patent is extended or adjusted under 35 U.S.C. 154(b) by 153 days.

(21) Appl. No.: 14/501,763

(22) Filed: Sep. 30, 2014

(65) Prior Publication Data

US 2016/0094655 A1    Mar. 31, 2016

(51) Int. Cl.
G06F 15/16    (2006.01)
H04L 29/08    (2006.01)
G06F 17/30    (2006.01)

(52) U.S. Cl.
CPC .... H04L 67/1095 (2013.01); G06F 17/30371 (2013.01)

(58) Field of Classification Search
CPC .......... H04L 29/08; H04L 67/1095; G06F 17/30371; G06F 2201/82; G06F 11/2007; G06F 11/2064; G06F 11/2069; G06F 11/2089; G06F 11/2071; Y10S 707/99953; Y10S 707/99952
USPC .......................................... 709/202
See application file for complete search history.

(56) References Cited

U.S. PATENT DOCUMENTS

| | | | |
|---|---|---|---|
| 7,640,408 B1* | 12/2009 | Halligan | G06F 3/0617 711/162 |
| 8,751,878 B1* | 6/2014 | Don | G06F 11/07 714/55 |
| 8,832,325 B1* | 9/2014 | George | G06F 3/0617 709/231 |
| 8,880,821 B1* | 11/2014 | Li | G06F 3/061 711/162 |
| 2004/0064639 A1* | 4/2004 | Sicola | G06F 11/2007 711/114 |

* cited by examiner

Primary Examiner — Tauqir Hussain
(74) Attorney, Agent, or Firm — R. Kevin Perkins; Krishnendu Gupta

(57) ABSTRACT

A method, system, and computer program product for data consistency, the system comprising sending an auto propagating message from a management host to hold IO for devices of a consistency group to at least one storage array of a set of storage arrays, and causing each storage array of the set of storage arrays, upon receiving the message, to send the hold message to each storage array to which they have connectivity.

7 Claims, 16 Drawing Sheets

CLOUD CONSISTENCY TECHNOLOGY

A portion of the disclosure of this patent document may contain command formats and other computer language listings, all of which are subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

TECHNICAL FIELD

This invention relates to data replication.

BACKGROUND

Computer data is vital to today's organizations, and a significant part of protection against disasters is focused on data protection. As solid-state memory has advanced to the point where cost of memory has become a relatively insignificant factor, organizations can afford to operate with systems that store and process terabytes of data.

Conventional data protection systems include tape backup drives, for storing organizational production site data on a periodic basis. Such systems suffer from several drawbacks. First, they require a system shutdown during backup, since the data being backed up cannot be used during the backup operation. Second, they limit the points in time to which the production site can recover. For example, if data is backed up on a daily basis, there may be several hours of lost data in the event of a disaster. Third, the data recovery process itself takes a long time.

Another conventional data protection system uses data replication, by creating a copy of the organization's production site data on a secondary backup storage system, and updating the backup with changes. The backup storage system may be situated in the same physical location as the production storage system, or in a physically remote location.

SUMMARY

A method, system, and computer program product for data consistency, the system comprising sending an auto propagating message from a management host to hold IO for devices of a consistency group to at least one storage array of a set of storage arrays, and causing each storage array of the set of storage arrays, upon receiving the message, to send the hold message to each storage array to which they have connectivity.

BRIEF DESCRIPTION OF THE DRAWINGS

Objects, features, and advantages of embodiments disclosed herein may be better understood by referring to the following description in conjunction with the accompanying drawings. The drawings are not meant to limit the scope of the claims included herewith. For clarity, not every element may be labeled in every figure. The drawings are not necessarily to scale, emphasis instead being placed upon illustrating embodiments, principles, and concepts. Thus, features and advantages of the present disclosure will become more apparent from the following detailed description of exemplary embodiments thereof taken in conjunction with the accompanying drawings in which:

DETAILED DESCRIPTION

Figure 1:
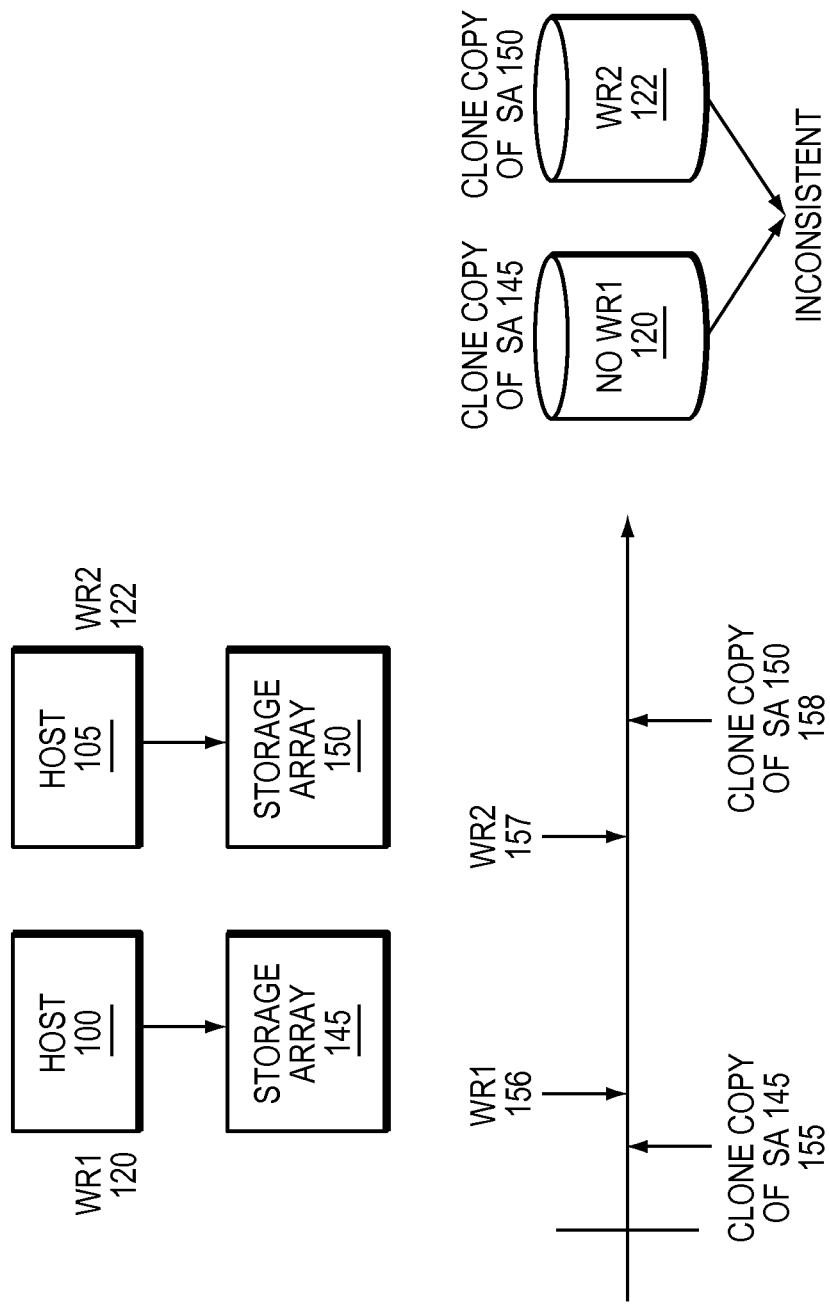
FIG. 1 is a simplified illustration of creation of an inconsistent clone, in accordance with an embodiment of the present disclosure.

Generally, to make a useful copy of multiple applications' data, the copy of applications' data should be in a consistent state. Conventionally, this may not be a problem when there is one application writing to storage using a direct link. Typically, the application may be paused and then a consistent copy of the storage may be taken. Usually, if an application and storage are separated by a switches or networks and the application's data is spread across multiple devices on multiple storage arrays, it may be more problematic to take a consistent copy of the storage due to delays between the application and storage. Typically, if the application stores data across many different types of storage distributed across a network, it may be more problematic to create a consistent copy of the storage. Conventionally with distributed storage, all IO must be held until a point of time for the copy is set of each of the storage mediums across the network is confirmed to be taken. Conventionally, as the number of storage devices that need to be paused increase in both number and geographic location, the more problematic it may be come to create a consistent copy of the data due to IO timeout restrictions.

Generally, in a data storage environment, applications may be running on multiple hosts. Usually, each host may be connected to one or more switches. Conventionally, each switch may in turn be connected to one or more storage arrays. Usually, each storage array may have one or more storage devices. Typically, each application may have files stored on multiple devices located on multiple storage arrays. Usually, an application may use dependent writes and the setting of any point in time for consistency group of devices in the consistency group, which may be located across storage arrays, must ensure the ordering of the dependent writes. In certain embodiments, applications may run on other devices, such as storage arrays, and storage arrays may drive IO to other storage arrays. As used herein, host may generally refer to the device driving IO to devices on storage arrays, but hosts may include storage arrays and other devices capable of driving IO.

In an embodiment, a requirement of an enterprise cloud may be to supply a consistency service to allow creating consistent copies within the cloud across different operating systems, applications and cloning technologies—all at enterprise-level scale, speed, reliability and security. In some embodiments, enterprise storage clouds may be a federation of multiple enterprise level storage arrays logically located together, with connectivity and compute elements, inside an enterprise cloud. As used herein, setting of any point in time for a clone copy may indicate marking the device at a given point in time to allow a clone copy of that point in time to be made.

Conventionally, multi-arrays consistency technology may be implemented using a management server connected to a heterogeneous arrays-set. Today, a management server may synchronize the arrays through the process of cloning devices. Typically, this could be done over TCPIP or fiber channel, but TCPIP is less scalable and less secure. Using current techniques, it may not be possible to take a clone when the number of devices becomes too great or the devices are too geographically disperse due to IO timeout constraints. Using conventional techniques, it may not be possible to take a consistent clone copy when there are millions of devices across thousands of storage arrays because a management server may not be able to serially contact storage arrays containing each device in a consistency group, to open the consistency group, create a clone copy, and close the group before an IO timeout occurs. Generally, an IO timeout may cause an application to crash. Usually, a limitation on the speed an IO takes to be sent between storage arrays or hosts may be limited by the speed of light.

In certain embodiments, the current disclosure enables consistent data copying across heterogeneous multi-arrays at enterprise level scale, speed, reliability and security. In some embodiments, the current disclosure enables Fiber Channel (FC) connectivity between the storage arrays in the Enterprise cloud, allowing each array to discover, and communicate with other arrays over Fiber Channel (FC). In many embodiments, each array may be connected to each other array, directly or indirectly, in the storage area network (SAN) through FC. In some embodiments, this may implement a Storage back-bone network. In many embodiments, the storage back-bone network may use fiber channel connections.

In some embodiments, a Fiber Channel storage area network may protect against external, IP based, attacks. In certain embodiments, storage arrays may be communication using VU SCSI commands to achieve specific operations—enhancing the security level by allowing only certain operations. In some embodiments, use of a consistency group trigger may be over fiber channel. In certain embodiments, enterprise cloud Consistency may require many LUNs in a cloud to stop processing writes while a setting of any point in time for a clone copy of each member of the consistency group may be made. In many embodiments, host based consistency triggering may not be practical due to the variety/amount of hosts and storage devices involved. In most embodiments, a storage array may have many devices that may belong to a consistency group.

In some embodiments, marking a consistent copy of data may require a consistency window to be opened on as many as million LUNs in a short time. In most embodiments, the period of time to open the window may be more than the SCSCI command timeout time for Fiber Channel. In certain embodiments, a management host, connected to at least one array, may discover the devices in a Consistency Group. In many embodiments, discovery of the arrays containing devices in a consistency group may occur by a management server discovering or contacting an array, which in turn discovers or contacts each array to which it is connected, to increase the speed of notification across the arrays. In most embodiments, each discovered array may discover other connected arrays and send a message to the management server. Traditionally, a management server may have discovered each array with devices individually, which may not been able to notify each array on a consistency group trigger before a SCSI IO timeout.

In some embodiments, a management host may send VU SCSI commands over a fiber channel backbone to reach arrays in a cloud. In many embodiments, a management host may notify devices participating in a consistency group that they are part of the consistency group. In an embodiment, the management host may contact the arrays using a fiber channel backbone. In most embodiments, each array discovered or contacted by the management array may in turn discover or contact each array it sees with the VU SCSI command to speed propagation of the command.

In most embodiments, once a consistency group has been activated on devices in the arrays in the consistency group, the arrays in a fiber channel backbone may relate the message to all arrays to which they are connected. In many embodiments, the command to open a consistency group window may propagate to the arrays and devices in the arrays in the fiber channel backbone quickly, which may be quicker than serial propagation, according to how the network is connected. In certain embodiments, by propagating the notification across many arrays the notifications may reach an enterprise level devices count quickly. In many embodiments, distributed dispersion of notifications may reduce requirements from a single element to manage the whole storage set. In further embodiments, if notifications to create the clone copy do not happen in a given period of time, the clone copy may be cancelled to prevent IO timeout.

Refer now to the example embodiment of FIG. 1, which illustrates an inconsistent clone of data. In the example embodiment of FIG. 1, Host 100 and Host 105 are executing writes WR1 120 and WR2 122 to devices 146 and 151 on storage arrays 145 and 150, respectively. Both storage array 145 and 150 have a device, devices 146 and 151, that are part of a consistency group and writes WR1 120 and WR2 122 are directed towards devices 146 and 151, respectively. Thus, if a consistent copy of the devices in the consistency group in storage arrays is to occur, the data must be consistent in the devices on each array.

In the example embodiment of FIG. 1, WR1 120 and WR2 122, represent two sequential and dependent writes. In FIG. 1, as WR2 122 is dependent on WR1 120, if WR2 122 is present then WR1 120 must also be present before a consistent clone of the devices on the consistency group of the storage array is taken; alternatively, if both writes are not present, the copy may be consistent. In this example embodiment, a clone copy of the device 146 of SA1 occurs as Clone Copy of devices 147 (step 155). Write WR1 120 occurs to device 146 on storage array 1 145 (step 156). Write WR2 122 occurs to device 151 storage array 150 (step 157). Then, clone copy of the devices 151 of storage array 2 151 occurs as copy 152 (step 158). Examining clone copy of the devices 147 of SA1 145 there is no WR1 120. Examining Clone of the devices 152 of SA2 150, there is a write WR2 122 is dependent on WR1 120, but WR1 120 is not present the clone copy of SA1 devices. Thus, the clone copies are inconsistent and unusable.

Figure 2:
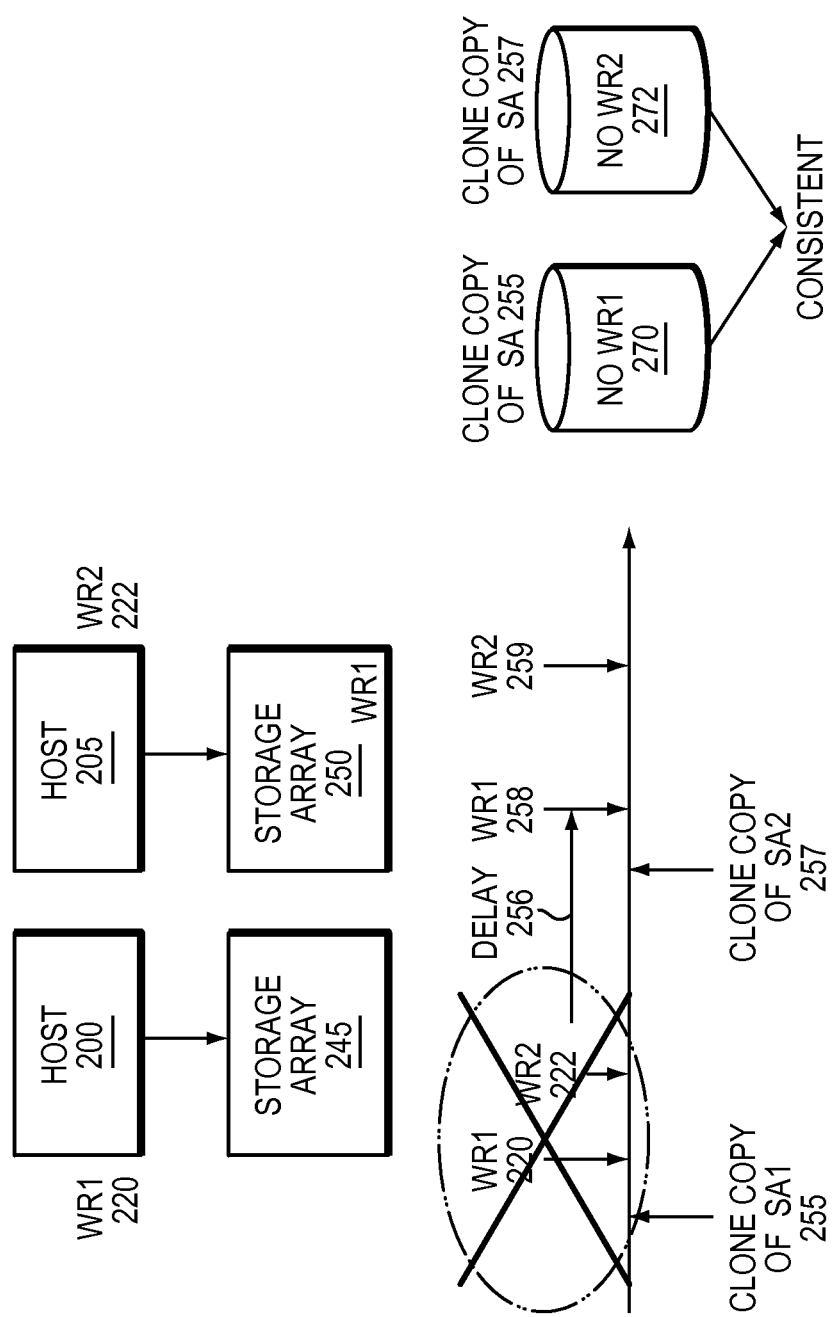
FIG. 2 is a simplified illustration of creation of a consistent clone, in accordance with an embodiment of the present disclosure.

Refer now to the example embodiment of FIG. 2, which illustrates delaying a write to ensure a consistent copy of data when taking a clone copy. In the example embodiment of FIG. 2, host 200 wants to execute WR1 220 and Host 205 wants to execute WR2 222 and WR 2 222 is dependent on WR1 220. These writes are to be executed on device 246 and 251 of storage arrays 245 and 250 respectively. In the example embodiment of FIG. 2, clone copy of device 246 on storage array 245 is taken (step 255). Write WR1 220 and WR2 222 are delayed (step 256). Clone copy of device 251 on storage array 250 is taken (step 257). WR1 220 occurs (step 258). WR2 222 occurs (step 259). Examining clone copy 247 of device 246 of storage array 245 there is no WR1 220. Examining clone copy 251 of device 251 of storage array 250, there is no WR2 222, thus the clone copies 247 and 252 are consistent.

Figure 3:
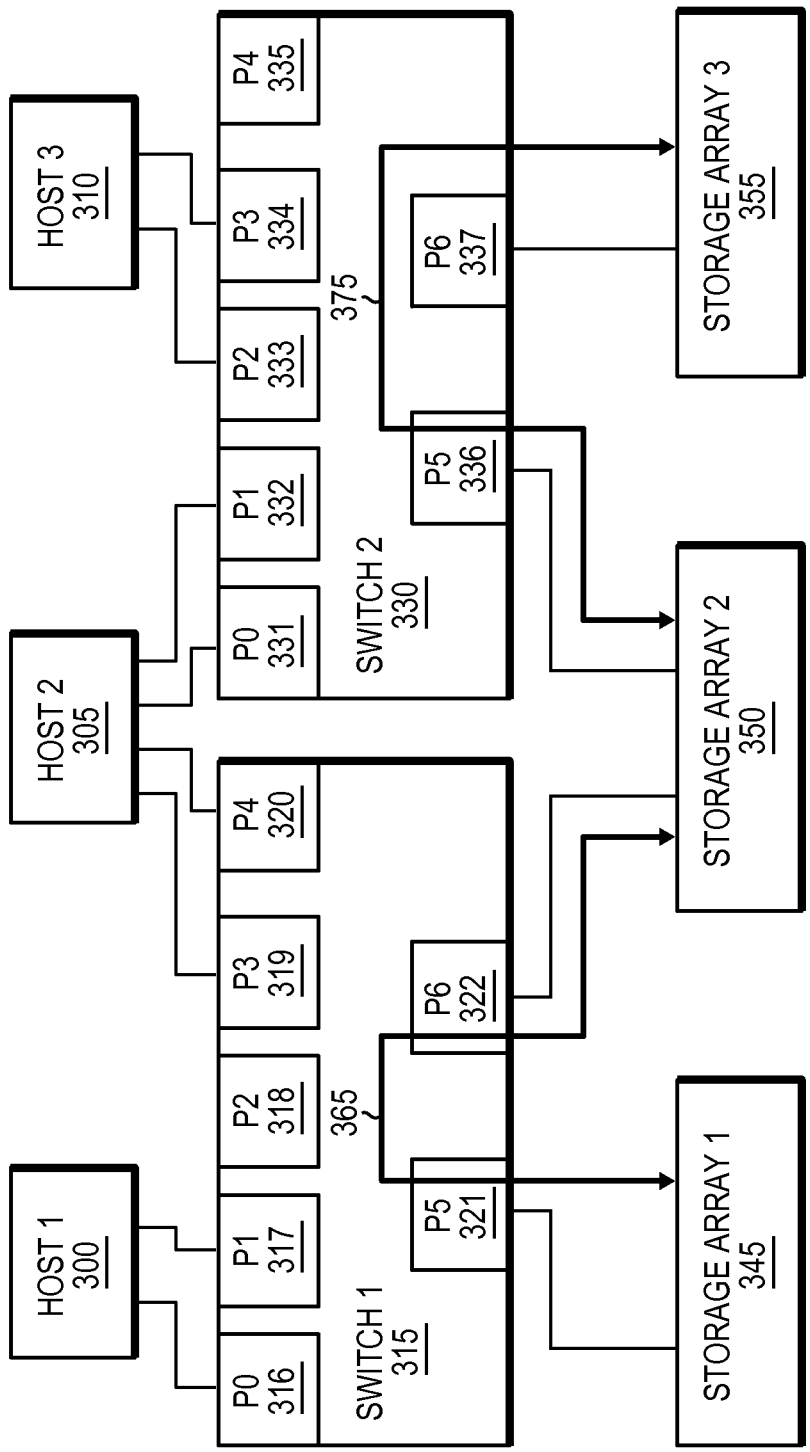
FIG. 3 is a simplified illustration of a host, switch, and storage array connectivity, in accordance with an embodiment of the present disclosure.

Refer now to the example embodiment of FIG. 3, which illustrates a set of connections between hosts, switches, and storage arrays. In the example embodiment of Figure three, there are three hosts host 1 300, host 2 305, and host 3 310. There are also two switches, switch 1 315 and switch 2 330. Switch 1 315 has seven ports P0-P6, labeled as ports 316-322 respectively. Switch 2 330 has seven ports P0-P6, labeled as ports 331-337 respectively. There are three storage arrays, storage array 1, 345, storage array 2 350, and storage array 3 355. Hosts 1 300, Host 2, 305, and Host 3, 330 are connected to Switch 1 315 and Switch 2 330. For illustrative purposes, Switch 1 315 is connected to Host 1 300 through ports P0 316 and P1 317. Host 1 300 may also have additional connections to switch 1 315 or switch 2 330, which are not illustrated. Storage array 2 350 is connected to switch 1 315 and switch 2 330. For illustrative purposes, storage array 2 350 is connected to port 6 322 of switch 1 315 and port p5 336 of switch 2 330. Although not illustrated, there may be any number of connections between the storage arrays and switches and switches and hosts. Switches 1 315 and switches 2 330 enable connectivity between the hosts and storage arrays. Switches 1 315 and switches 2 330 also enable connectivity between the storage arrays themselves as illustrated by lines 365 and 375. In this embodiment, connections between storage array 1 345, storage array 2 350 and storage array 3 355 form a fiber channel backbone.

In this embodiment, the connectivity provided by the switches is given by a connectivity table stored in the switch. Connectivity table 370 is an example of a portion of a connectivity table of a switch. Connectivity table 370 shows host 1 300 may reach storage array 1 345 through initiator port P0 through target port P5. As well, connectivity table 370 shows that storage array 1 345 may reach storage array 2 350 through initiator port P5 in switch 1 to target port P6 in switch 1.

Figure 4:
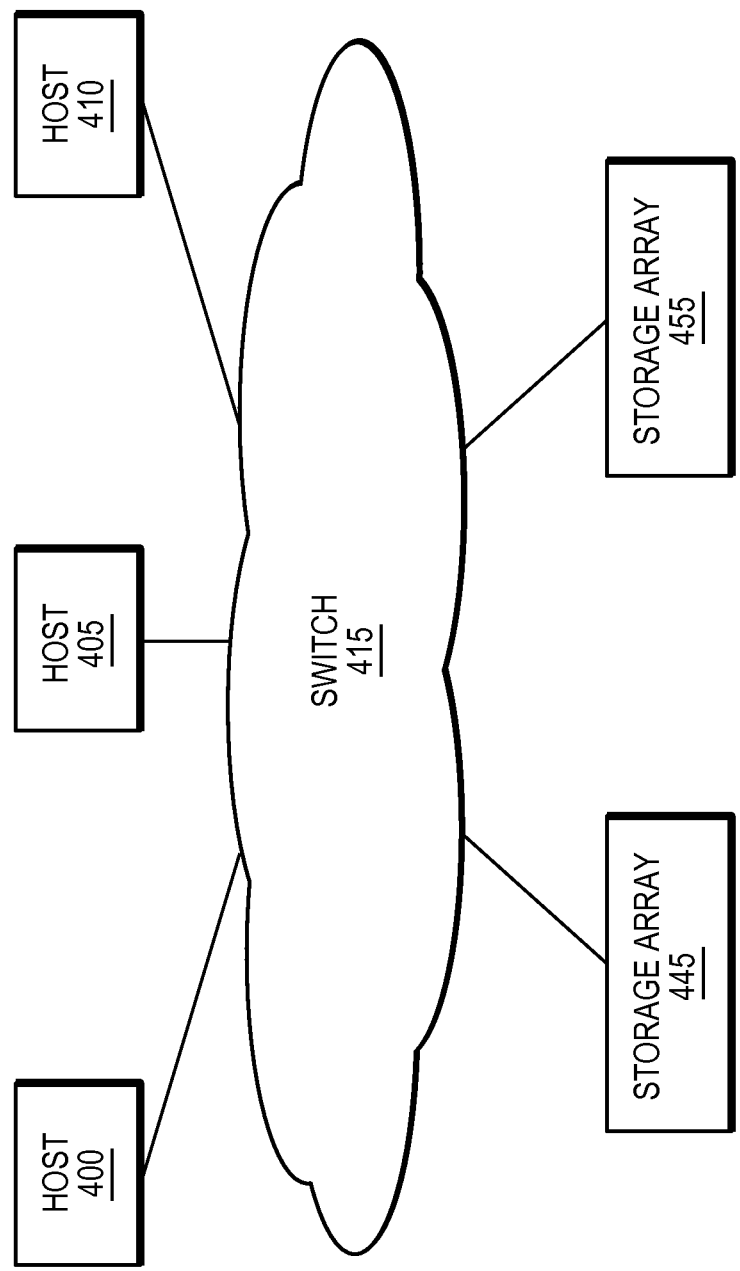
FIG. 4 is an alternative simplified illustration of a host, switch, and storage array connectivity, in accordance with an embodiment of the present disclosure.

Refer now to the example embodiment of FIG. 4, which illustrates a simplified connection between hosts, switches and storage arrays. In the example embodiment of FIG. 4, hosts 400, 405, and 410 are connected to switch cloud 415. Switch cloud 415 may be any number of switches, but for simplicity has been referred to as switch 415. Switch cloud 415 is also connected to storage array 445 and storage array 455.

Figure 5:
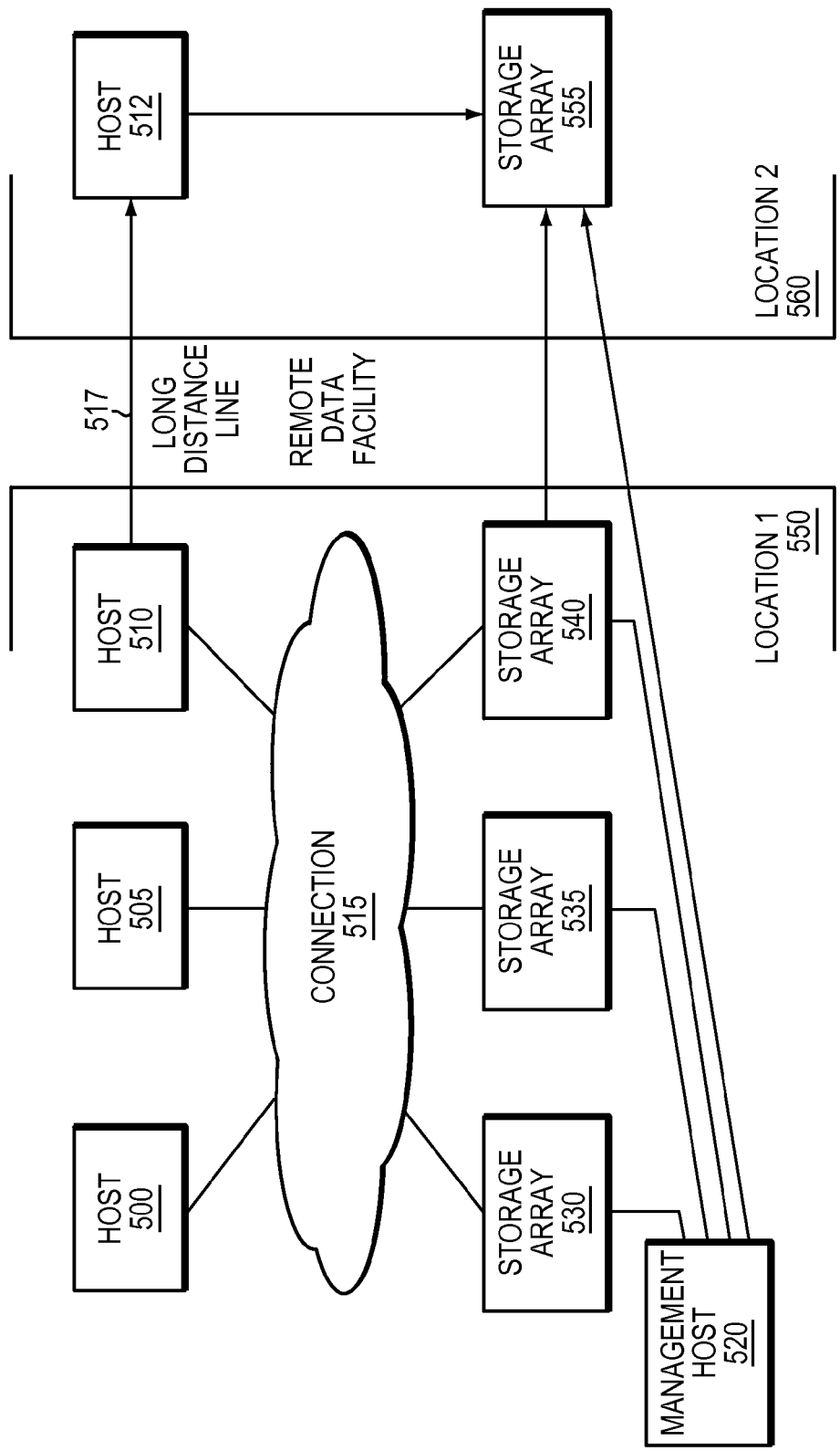
FIG. 5 is a further simplified alternative illustration of a host, switch, and storage array connectivity, in accordance with an embodiment of the present disclosure.

Refer now to the example embodiment of FIG. 5, which illustrates a management host and storage arrays. In the example embodiment of FIG. 5, there are four hosts, host 500, host 505, host 510 host 512, connection 515, management host 520, storage arrays 530, 535, and 540, and storage array 555. Host 512 and storage array 555 are located in location 2 560 which is in a geographically disparate location from hosts 500, 505, 510, management host 520, and storage arrays 530, 535, and 540. In this embodiment, it may take too much time for management host 520 to serially communicate to each storage array to tell certain devices on the storage array to open a consistency group, receive confirmation the group is open, tell each array to mark the point of time for the devices that are part of the consistency group, and close the marking of the point in time before an IO timeout occurs.

In many embodiments, there may be a registration process. In certain embodiments, a registration process may propagate a discovery message across a set of arrays containing one or more devices in one or more consistency groups to ensure that each array is connected either directly or indirectly, i.e. through other arrays, to all other arrays. In most embodiments, there may be a distributed execution of creation of a consistency group and cloning the devices of the arrays in the consistency group. In at least some embodiments, given a proper registration, a management host may contact each connected array with a command to trigger a consistency session on a consistency group and each discovered array will in turn notify each connected array with devices in the consistency group to trigger the group. In most embodiments, once a consistency group has been triggered, the array will set a status about the devices in the triggered group that may be read by a management host. In many embodiments, by having each contacted array contact each other array it sees, the message to open a consistency group may reach the arrays in an exponential instead of linear manner. In certain embodiments, an array without devices in the consistency group by ignore the message other than sending it to each array to which it is connected.

Figure 6:
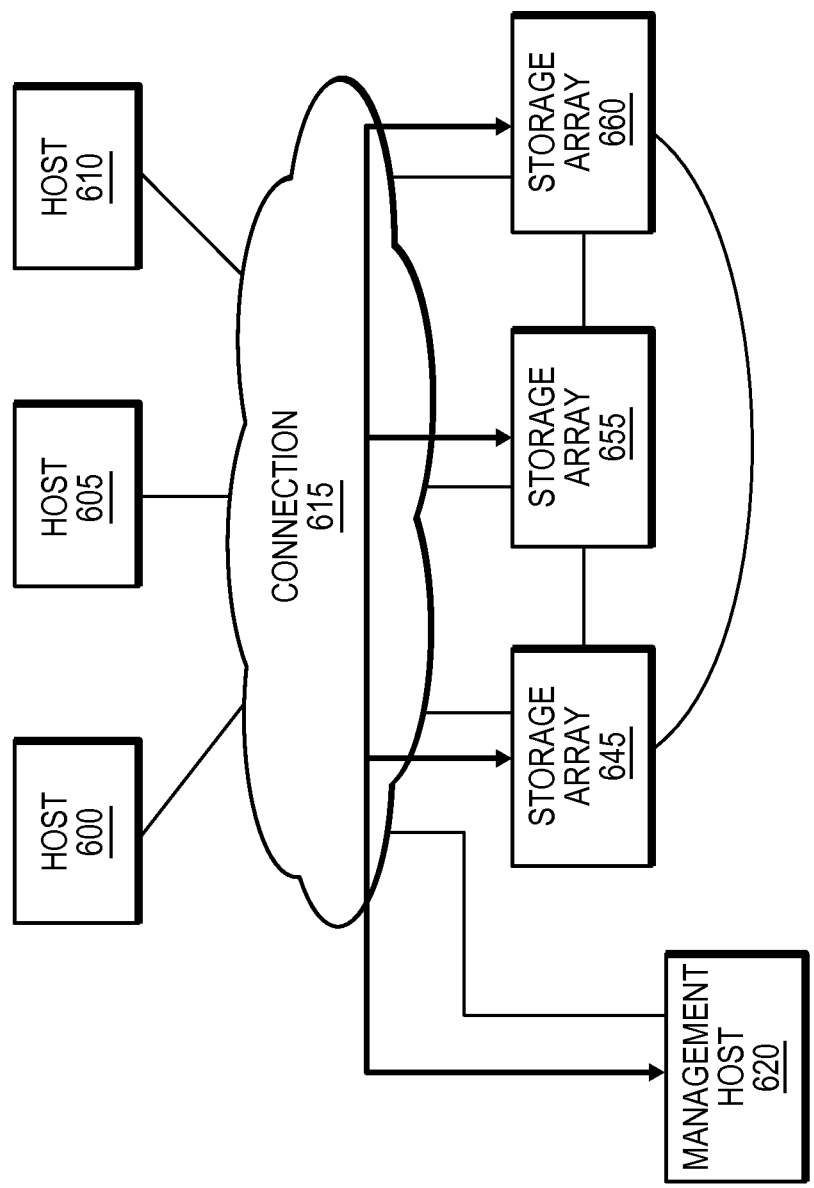
FIG. 6 is simplified illustration of a management array, host, switch, and storage array connectivity, in accordance with an embodiment of the present disclosure.
Figure 7:
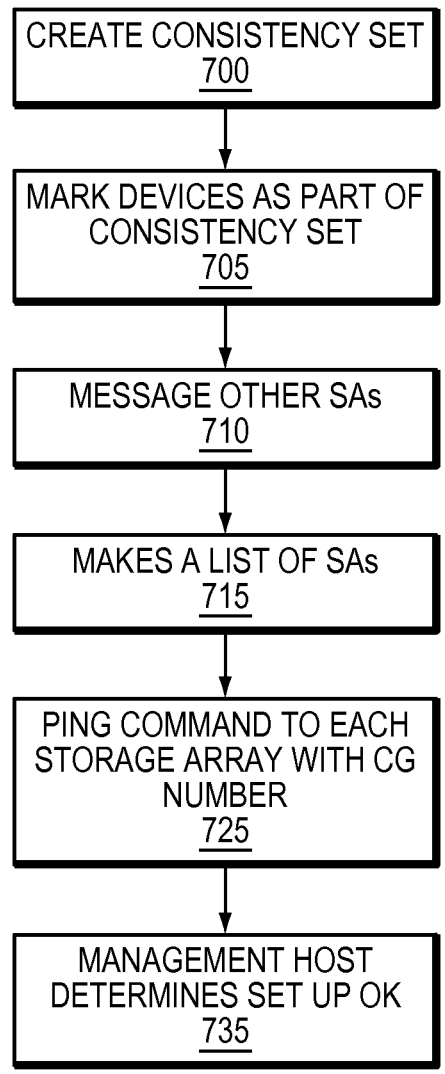
FIG. 7 is a simplified example of a method for registering devices in a consistency group, in accordance with an embodiment of the present disclosure.

Refer now to the example embodiments of FIGS. 6 and 7, which illustrate a management host determining which devices are part of a consistency group. Using management host 620, a user creates a consistency group containing a number of devices located on storage arrays 645, 655, and 660 (step 700). The management host has a direct connection to each of the storage arrays, 645, 655, 660, and may mark the devices as a part of the consistency group (step 705). The management host 620 sends a message to all the arrays it sees that a consistency group registration process has begun (step 707). Each messaged storage array, 645, 655, 660, messages all other storage arrays it sees (step 710). Each storage array makes a list of the other storage arrays it sees and marks that it has been seen and has connectivity to be accessed, directly or indirectly by management host 620 (step 715). Each storage array, 645, 655, 660, contacts each storage array it sees in the consistency group (step 725).

Each contacted storage array executes steps 710 to 725. Note, each storage array may have multiple devices that are part of the consistency group. After a given period of time, management host 620 determines the setup is ok by sending an auto propagating command to each storage array to determine if it has marked itself as seen (step 735). In this embodiment, if each storage array has been contacted, then there is interconnection between each storage array and the group has been set up correctly. In most embodiments, the storage array will set a contacted status that may be polled by a management server. In most embodiments, if a storage array has not been discovered or contacted, then the contact status would not be set and the management host determines this each storage array is not connected to any other storage array through connection and the setup has failed.

Figure 8:
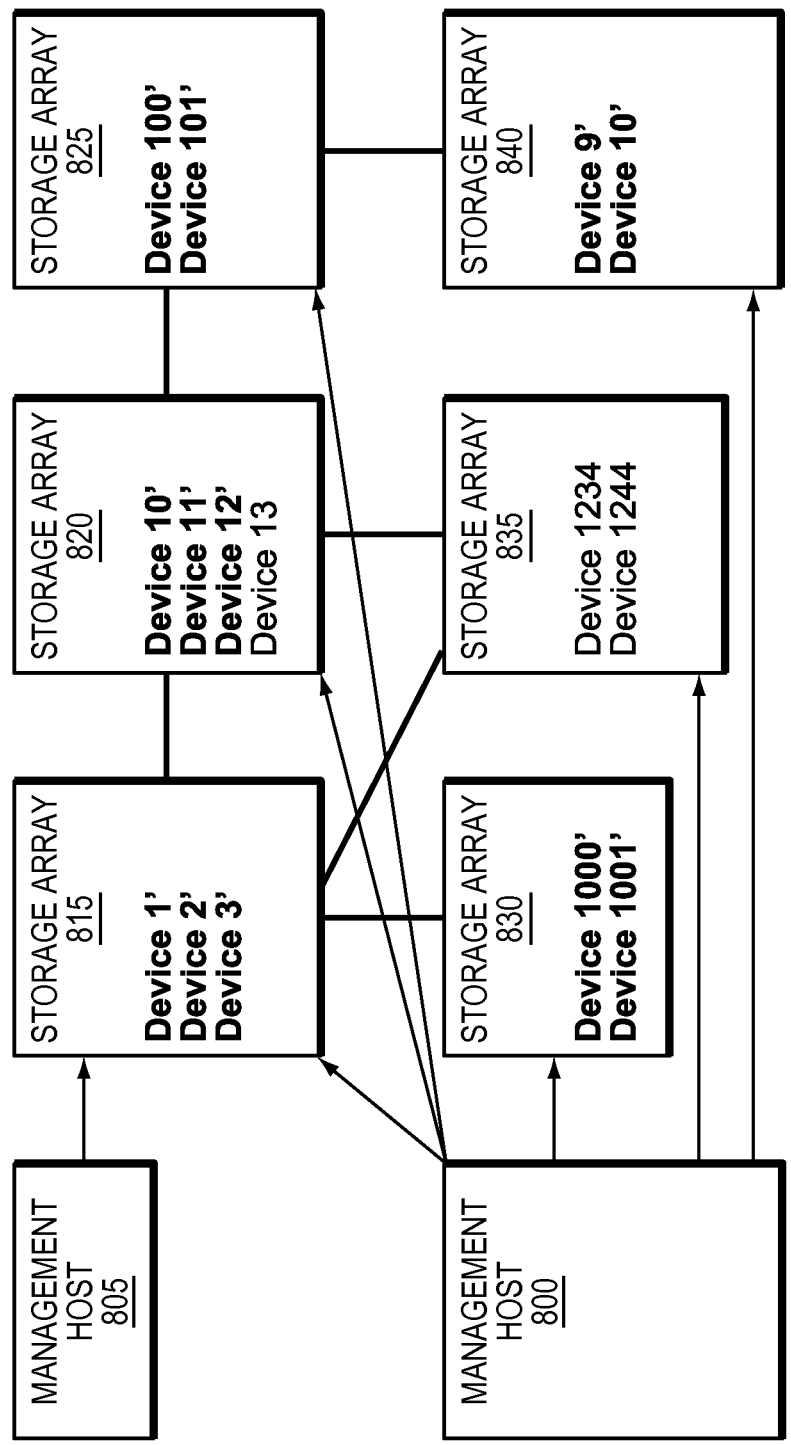
FIG. 8 is an alternative simplified illustration of a management array, host, switch, and storage array connectivity, in accordance with an embodiment of the present disclosure.
Figure 9:
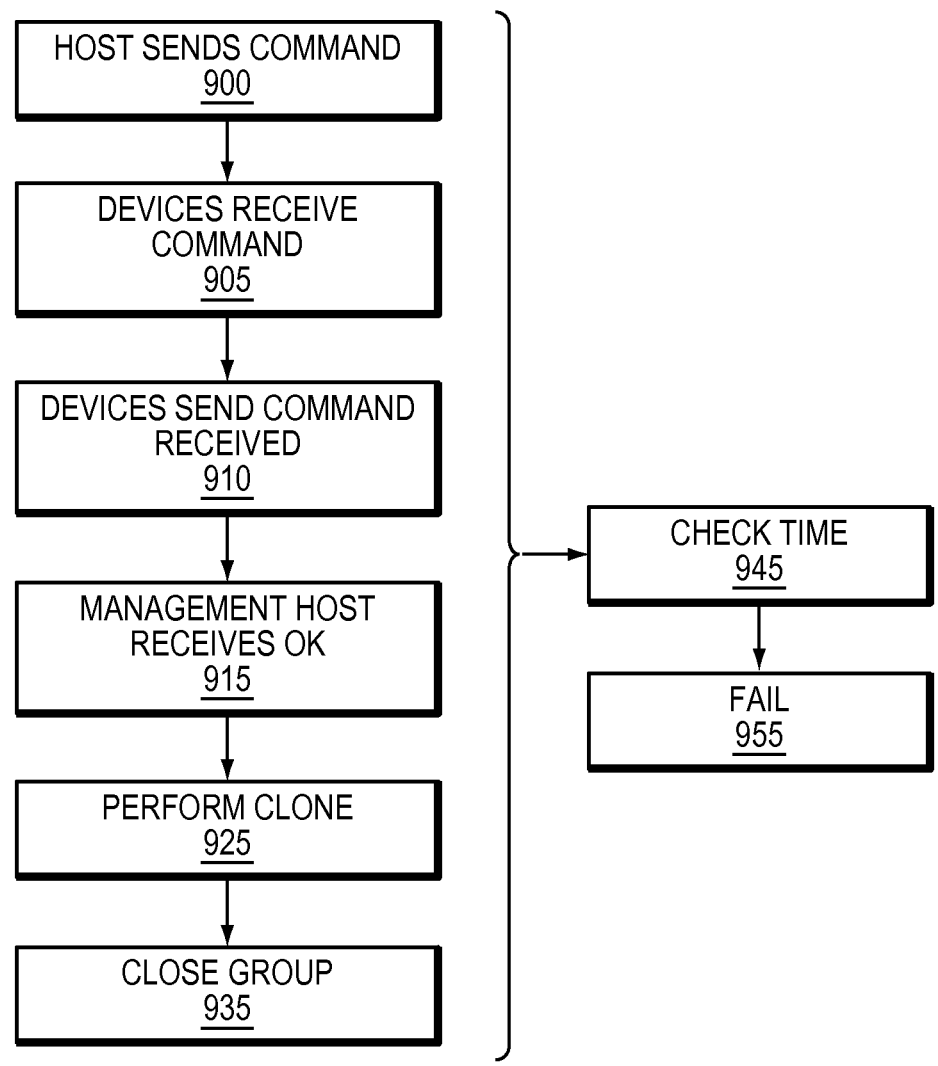
FIG. 9 is a simplified example of a method for creating a clone copy using distributed notification, in accordance with an embodiment of the present disclosure.

Refer now to the example embodiments of FIGS. 8 and 9, which illustrate opening a consistency group for devices spread across a number of storage arrays. In FIG. 8, there is management host 800 and management host 805. In other embodiments, management host 800 and 805 may be the same host. There are also six storage arrays, storage arrays 815, 820, 825, 830, 835, and 840. Devices marked by a prime ("'") are devices that have been included as part of a particular consistency group, such as device 1000' and device 1001' on storage array 830. In this example embodiment, a method similar to that of FIG. 7 has been applied to discover the storage arrays and ensure sufficient connectivity within the consistency group.

Management host 805 sends a command to trigger the consistency group to all storage array to which it is connected (step 900). The command to trigger the consistency group propagates as each storage array sends the command to each storage array it sees. When a storage array receives the command (step 905) from either management host 805 or another storage array, the storage array send a message that the command has been received (step 910) and that the storage arrays are holding write IOs to devices that in the consistency group. Management host receives ok command from each of the storage arrays (step 915). Management host 805 sends an autopropogated command to perform a clone each storage array it sees, which in turn sends the command to each storage array it sees (step 925). After each storage array has completed the clone of the devices which are members of the consistency group, the storage array notifies the management host of successful completion by changing its status, where the management host periodically contacts each array for its status. After management host receives the complete command, it sends a command to close the consistency group. Note, in this embodiment storage array 1035 has devices 1034 and 1044 which are not part of the consistency group so they are not cloned. In the background as the clone is being triggered, each storage array is checking the amount of time it has been holding IOs (step 945). If the time IOs are being held comes close to the IO timeout time, then the storage array will fail the clone trigger by setting a fail status that may be read by management host 1000 and start processing IOs (step 955).

Figure 10:
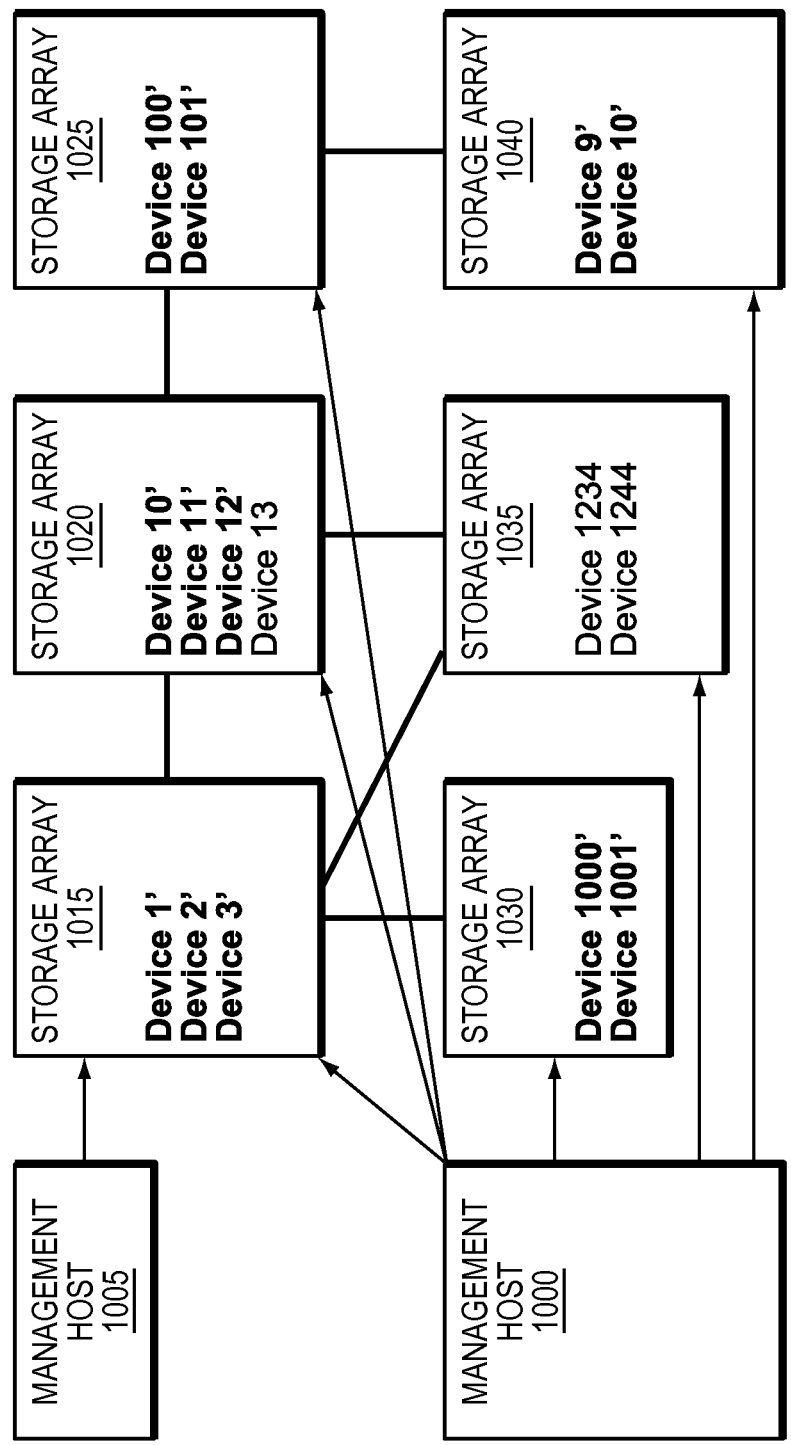
FIGS. 10-13 are simplified illustrations of a message propagating across storage arrays, in accordance with an embodiment of the present disclosure.
Figure 11:
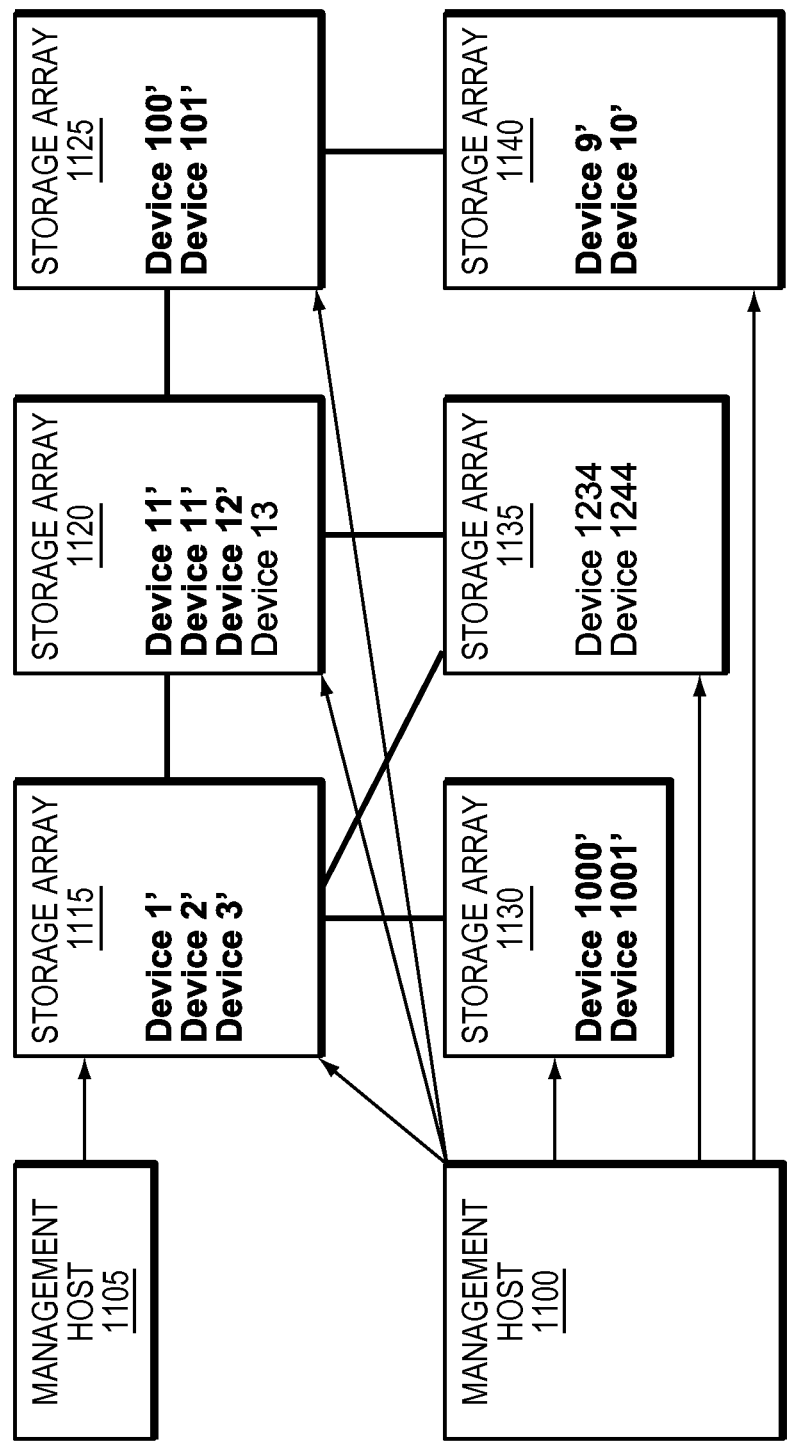
Figure 12:
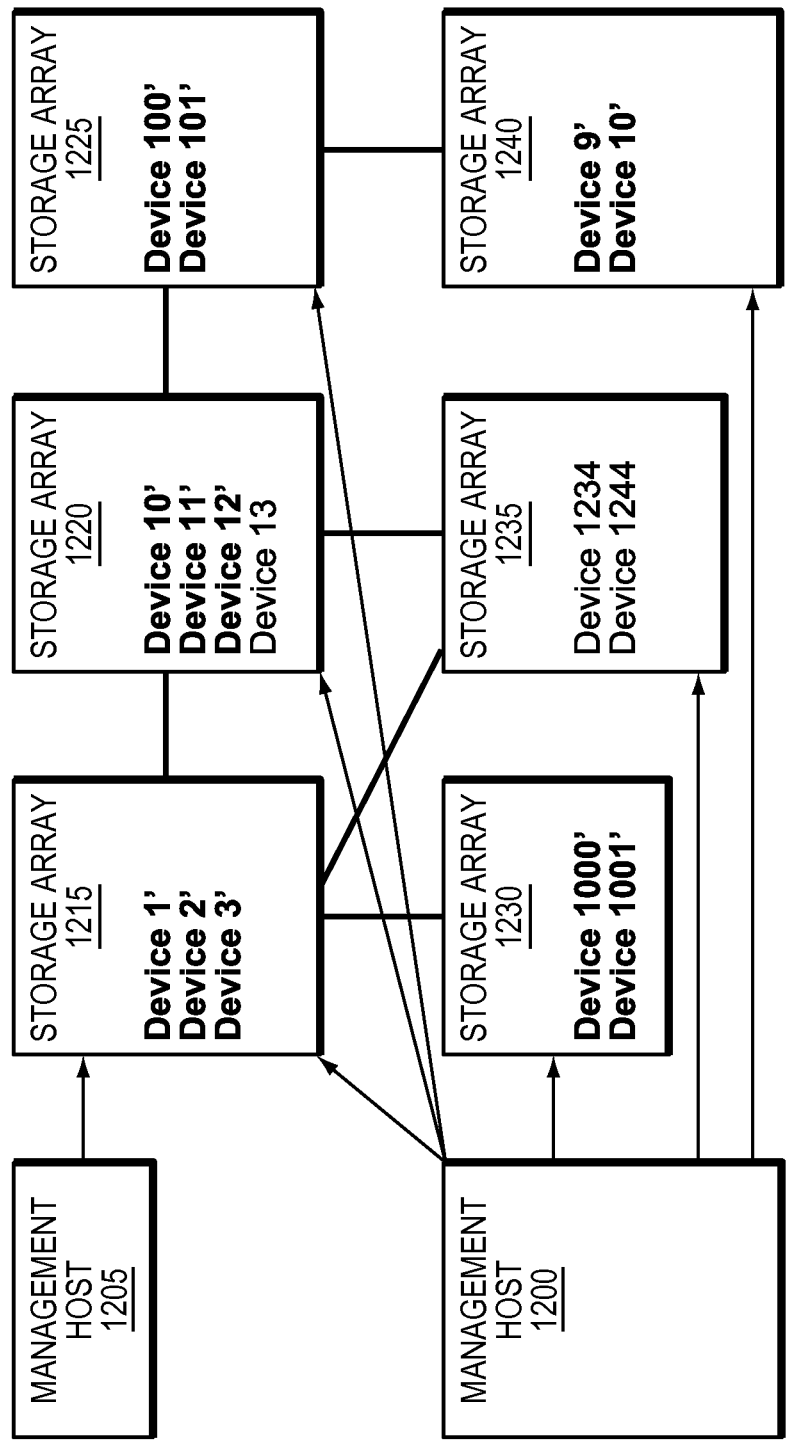
Figure 13:
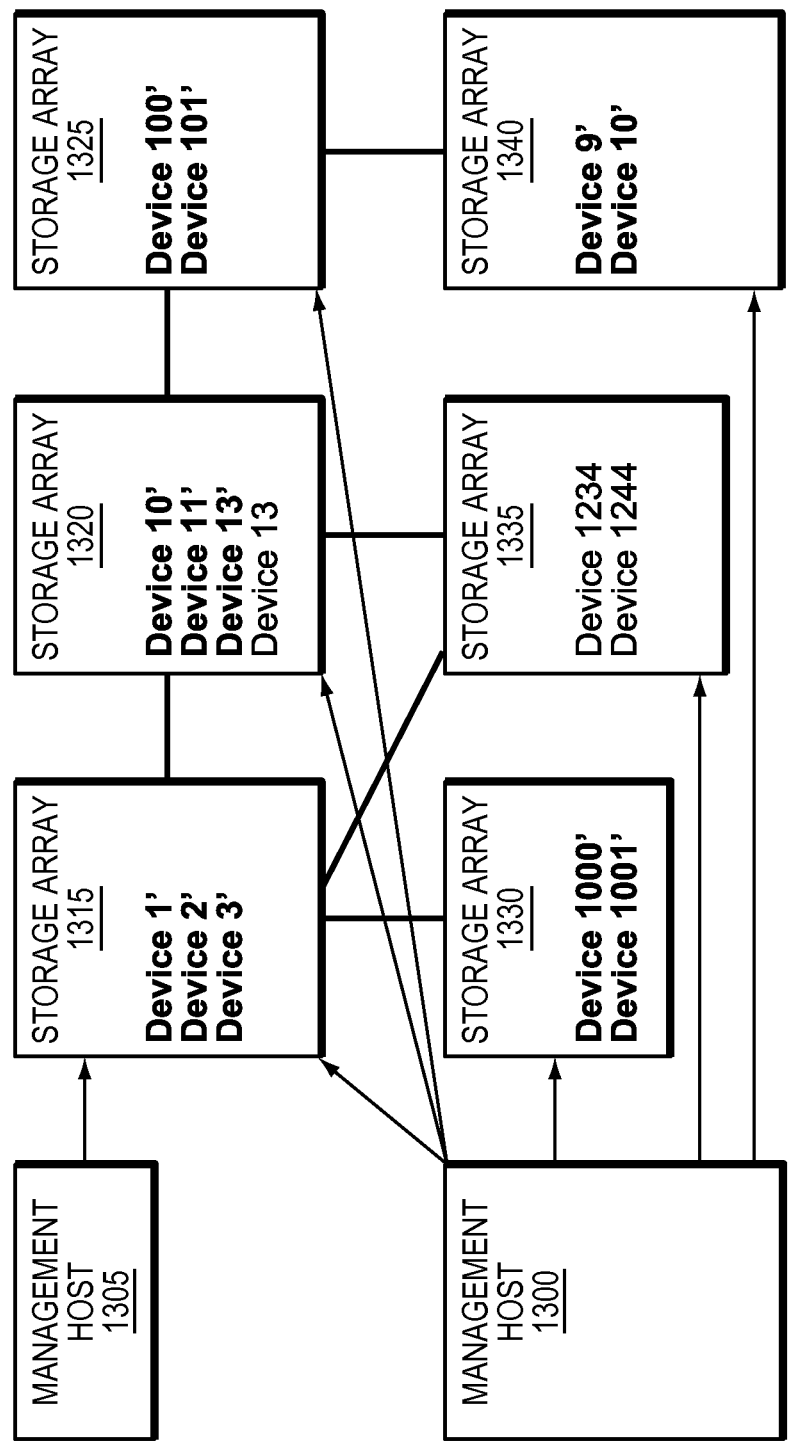

Refer now to the example embodiments of FIGS. 10-13, which illustrate how a message may propagate from a management host across storage arrays. In FIG. 10, Management host 1005 sends a message to storage array 1015. In FIG. 11, storage array 1115 sends a message to storage arrays 1120, 1130, and 1135. In FIG. 12, storage array 1220 sends a message to storage array 1225 and storage array 1235. In FIG. 13, storage array 1325 sends a message to storage array 1340. As illustrated in FIGS. 10-13, the message can propagate across the storage arrays network quicker than a management host were to try and directly but serially send messages to each and every array individually.

Figure 14:
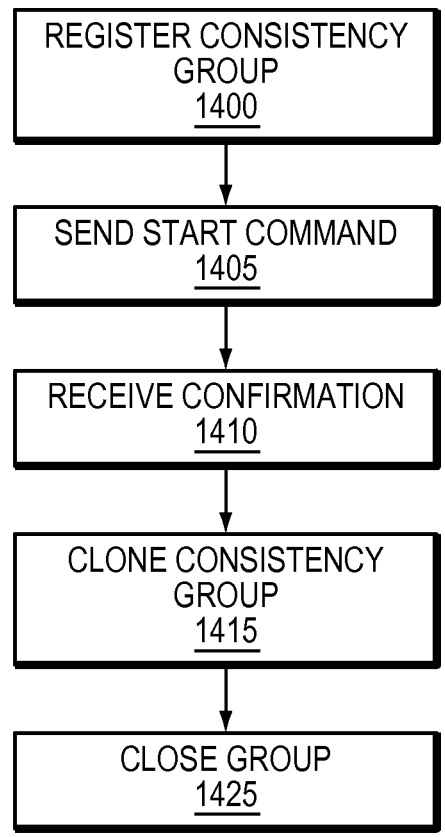
FIG. 14 is a simplified example of a method for registering devices in a consistency group and taking a clone copy, in accordance with an embodiment of the present disclosure.

Refer now to the example embodiment of FIGS. 6 and 14. Management host 620 registers a consistency group (step 1400). Management host 620 sends a trigger command (step 1405). Management host 620 confirms that the arrays 645, 655, and 660, have received the start command (step 1410). Each device in the consistency group activates cloning (step 1415). Management host 620 closes the consistency group (step 1425).

Figure 15:
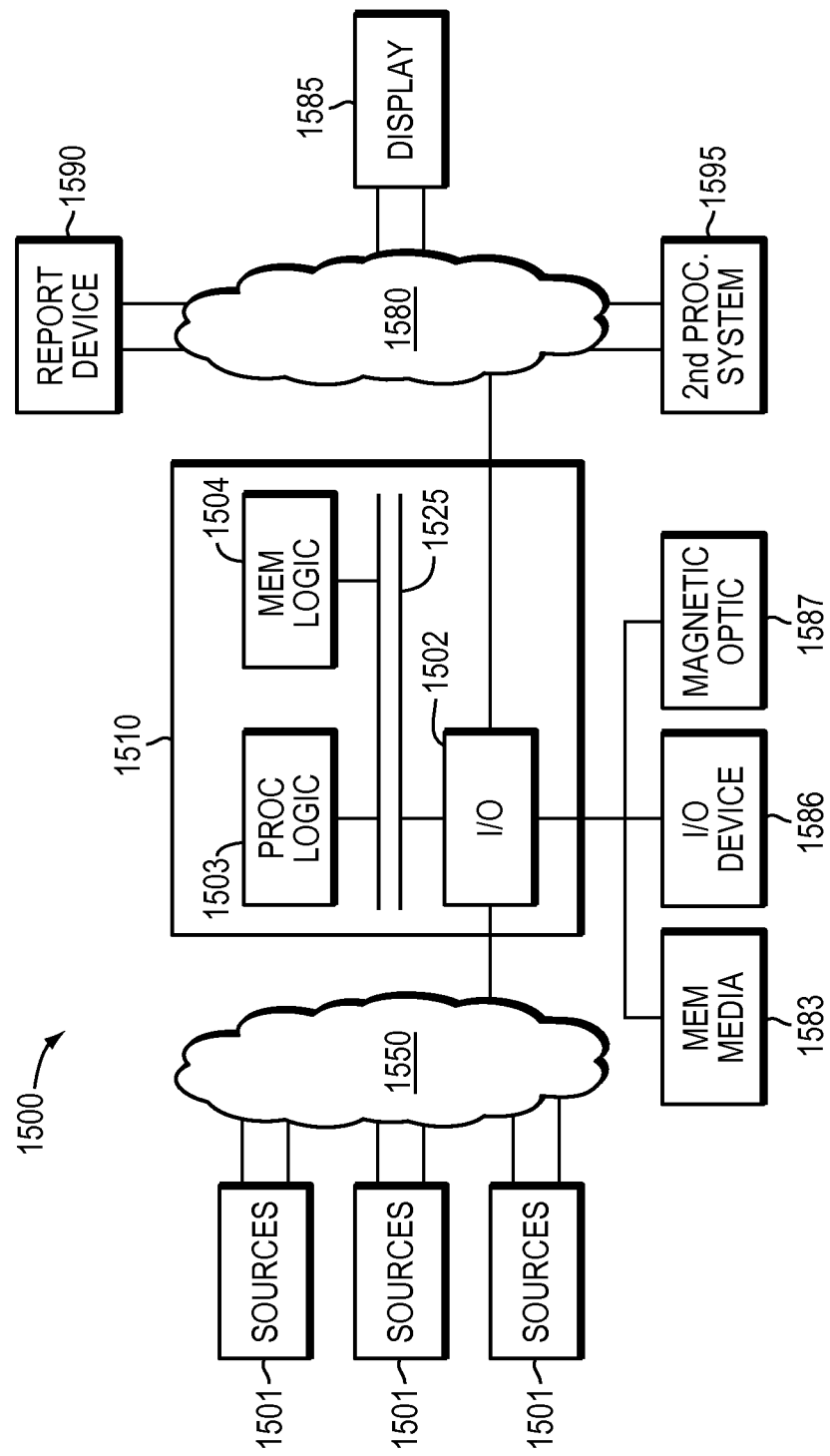
FIG. 15 is an example of an embodiment of an apparatus that may utilize the techniques described herein, in accordance with an embodiment of the present disclosure.
Figure 16:
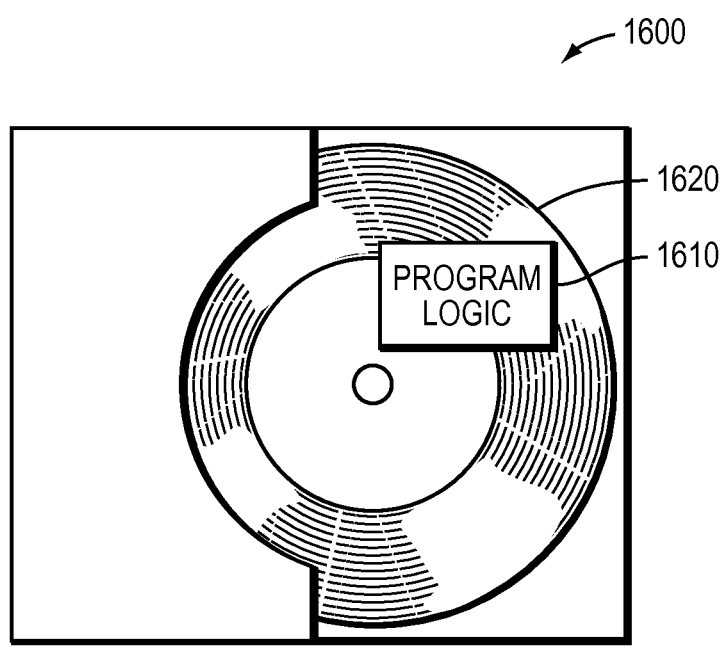
FIG. 16 is an example of a method embodied on a computer readable storage medium that may utilize the techniques described herein, in accordance with an embodiment of the present disclosure.

The methods and apparatus of this invention may take the form, at least partially, of program code (i.e., instructions) embodied in tangible media, such as floppy diskettes, CD-ROMs, hard drives, random access or read only-memory, or any other machine-readable storage medium. When the program code is loaded into and executed by a machine, such as the computer of FIG. 15, the machine becomes an apparatus for practicing the invention. When implemented on one or more general-purpose processors, the program code combines with such a processor 1503 to provide a unique apparatus that operates analogously to specific logic circuits. As such a general purpose digital machine can be transformed into a special purpose digital machine. FIG. 16 shows Program Logic 1634 embodied on a computer-readable medium 1630 as shown, and wherein the Logic is encoded in computer-executable code configured for carrying out the reservation service process of this invention and thereby forming a Computer Program Product 1600. The logic 1634 may be the same logic 1540 on memory 1504 loaded on processor 1503. In some embodiments, the processor may be a virtual or physical processor. The program logic may also be embodied in software modules, as modules, or as hardware modules.

The logic for carrying out the method may be embodied as part of the system described below, which is useful for carrying out a method described with reference to embodiments shown in, for example, FIGS. 7, 9, and 14. For purposes of illustrating the present invention, the invention is described as embodied in a specific configuration and using special logical arrangements, but one skilled in the art will appreciate that the device is not limited to the specific configuration but rather only by the claims included with this specification.

Although the foregoing invention has been described in some detail for purposes of clarity of understanding, it will be apparent that certain changes and modifications may be practiced within the scope of the appended claims. Accordingly, the present implementations are to be considered as illustrative and not restrictive, and the invention is not to be limited to the details given herein, but may be modified within the scope and equivalents of the appended claims.

What is claimed is:

1. A system for data consistency, the system comprising:
a management host; wherein the management host is connected to at least one storage array of a set of storage arrays; and
computer-executable logic operating in memory, wherein the computer-executable program logic is configured for execution of;
sending an auto propagating message from the management host to hold IO for devices of a consistency group to the at least one storage array of the set of storage arrays;
causing each storage array of the set of storage arrays, upon receiving the message, to send the hold message to each storage array to which they have connectivity;
polling, by the management host, a status of the set of storage arrays to determine if registration has been successfully completed;
wherein the connectivity is through fiber channel;
changing a status on each storage array of the set of storage arrays when the storage array receives the message; wherein the status denotes that a storage array has received the hold message for the consistency group;

polling, by the management array, the status of the storage arrays;

upon confirming that each storage array of the storage arrays that has devices in the consistency group received the hold, sending an auto propagating clone activate message from the management host to perform a clone of the devices of the consistency group to the at least one storage array of the set of storage arrays;

causing each storage array of the set of storage arrays, upon receiving the auto propagating clone activate message, to send the clone activate message to each storage array to which they have connectivity;

changing the status on each storage array of the set of storage arrays when the storage array receives the message; wherein the status denotes that a storage array has completed setting the clone for the consistency group; and polling, by the management array, the status of the storage arrays to confirm the clone has been set.

2. The system of claim 1 wherein the logic is further configured for;

enabling each storage array of the set of storage arrays determine the amount of time it has been holding IO;

determining if the IO has been held at a particular storage array of the set of storage arrays beyond a timeout time for the IO;

causing the particular storage array of the set of storage arrays to start accepting IO;

changing the status on the particular storage array of the set of storage arrays to denote setting of the clone copy failed; and polling, by the management array, the status of the set of storage arrays to determine the clone has not been successfully set.

3. A method for data consistency, the system comprising:

sending an auto propagating message from a management host to hold IO for devices of a consistency group to at least one storage array of a set of storage arrays;

causing each storage array of the set of storage arrays, upon receiving the message, to send the hold message to each storage array to which they have connectivity;

polling, by the management host, a status of the set of storage arrays to determine if registration has been successfully completed;

wherein the connectivity is through fiber channel;

changing a status on each storage array of the set of storage arrays when the storage array receives the message; wherein the status denotes that a storage array has received the hold message for the consistency group;

polling, by the management array, the status of the storage arrays;

upon confirming that each storage array of the storage arrays that has devices in the consistency group received the hold, sending an auto propagating clone activate message from the management host to perform a clone of the devices of the consistency group to the at least one storage array of the set of storage arrays;

causing each storage array of the set of storage arrays, upon receiving the auto propagating clone activate message, to send the clone message to each storage array to which they have connectivity;

changing the status on each storage array of the set of storage arrays when the storage array receives the message; wherein the status denotes that a storage array has completed setting the clone for the consistency group; and polling by the management array, the status of the storage arrays to confirm the clone has been set.

4. The method of claim 3 further comprising;

enabling each storage array of the set of storage arrays determine the amount of time it has been holding IO;

determining if the IO has been held at a particular storage array of the set of storage arrays beyond a timeout time for the IO;

causing the particular storage array of the set of storage arrays to start accepting IO;

changing the status on the particular storage array of the set of storage arrays to denote setting of the clone copy failed; and polling, by the management array, the status of the set of storage arrays to determine the clone has not been successfully set.

5. A computer program product comprising:

a non-transitory computer readable medium encoded with computer executable program code, the code configured to enable the execution of:

sending an auto propagating message from a management host to hold IO for devices of a consistency group to at least one storage array of a set of storage arrays;

causing each storage array of the set of storage arrays, upon receiving the message, to send the hold message to each storage array to which they have connectivity;

polling, by the management host, a status of the set of storage arrays to determine if registration has been successfully completed;

wherein the connectivity is through fiber channel;

changing a status on each storage array of the set of stotage arrays when the storage array receives the message; wherein the status denotes that a storage array has received the hold message for the consistency group;

polling, by the management array, the status of the storage arrays;

upon confirming that each storage array of the storage arrays that has devices in the consistency group received the hold, sending an auto propagating clone activate message from the management host to perform a clone of the devices of the consistency group to the at least one storage array of the set of storage arrays;

causing each storage array of the set of storage arrays, upon receiving the auto propagating clone activates message, to send the clone activate message to each storage array to which they have connectivity;

changing the status on each storage array of the set of storage arrays when the storage array receives the message; wherein the status denotes that a storage array has completed setting the clone for the consistency group; and polling, by the management array, the status of the storage arrays to confirm the clone has been set.

6. The computer program product of claim 5 wherein the logic is further configured for execution of:

enabling each storage array of the set of storage arrays determine the amount of time it has been holding IO;

determining if the IO has been held at a particular storage array of the set of storage arrays beyond a timeout time for the IO;

causing the particular storage array of the set of storage arrays to start accepting IO;

changing the status on the particular storage array of the set of storage arrays to denote setting of the clone copy failed; and polling, by the management array, the status of the set of storage arrays to determine the clone has not been successfully set.

7. The method of claim 3, further comprising:

sending an auto propagating registration message from a management host to registration devices of a consistency group to at least one storage array of a set of storage arrays; and causing each storage array of the set of storage arrays, upon receiving the registration message, to send the registration message to each storage array to which they have connectivity.

* * * * *